United States Patent
Radha et al.

(10) Patent No.: US 6,629,318 B1
(45) Date of Patent: Sep. 30, 2003

(54) DECODER BUFFER FOR STREAMING VIDEO RECEIVER AND METHOD OF OPERATION

(75) Inventors: Hayder Radha, East Lansing, MI (US); Kavitha Parthasarathy, Sunnyvale, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/365,463

(22) Filed: Aug. 2, 1999

Related U.S. Application Data (60) Provisional application No. 60/108,939, filed on Nov. 18, 1998.

(51) Int. Cl.[7] .......................... H04N 7/173; H04N 7/16; H04L 1/18; H04J 1/00; H04B 1/66
(52) U.S. Cl. .......................... 725/134; 725/89; 725/131; 725/142; 714/746; 714/748; 714/749; 714/750; 370/394; 370/486; 370/487; 375/240.26; 375/240.28; 348/419.1; 348/423.1
(58) Field of Search .................. 725/134, 142, 725/89, 94, 131; 714/746, 748, 749, 750; 370/394, 486, 487; 375/240.26–240.28; 348/419.1, 423.1

(56) References Cited

U.S. PATENT DOCUMENTS

| | | | | |
|---|---|---|---|---|
| 5,109,384 A | * | 4/1992 | Tseung | 371/32 |
| 5,550,847 A | * | 8/1996 | Zhu | 371/32 |
| 5,652,627 A | * | 7/1997 | Allen | 348/497 |
| 5,666,484 A | * | 9/1997 | Orimo et al. | 395/182.16 |
| 5,680,322 A | * | 10/1997 | Shinoda | 364/514 |
| 5,751,883 A | * | 5/1998 | Ottesen et al. | 386/27 |
| 5,768,527 A | | 6/1998 | Zhu et al. | 709/231 |
| 5,768,533 A | * | 6/1998 | Ran | 395/200.77 |
| 5,918,002 A | * | 6/1999 | Klemets et al. | 395/182.16 |
| 5,930,480 A | * | 7/1999 | Staats | 395/200.74 |
| 6,026,097 A | * | 2/2000 | Voois et al. | 370/468 |
| 6,031,818 A | * | 2/2000 | Lo et al. | 370/216 |
| 6,032,180 A | * | 2/2000 | Nishikawa | 709/217 |
| 6,085,252 A | * | 7/2000 | Zhu et al. | 709/231 |
| 6,104,757 A | * | 8/2000 | Rhee | 375/240 |
| 6,141,385 A | * | 10/2000 | Yamaji | 375/240.27 |
| 6,172,983 B1 | * | 1/2001 | Shaffer et al. | 370/446 |
| 6,275,471 B1 | * | 8/2001 | Bushmitch et al. | 370/248 |
| 6,310,897 B1 | * | 10/2001 | Watanabe et al. | 370/522 |

OTHER PUBLICATIONS

"A Distributed Real–Time MPEG Video Audio Player", Department of Computer Science and Engineering, Portland Oregon, pp. 1–11.

* cited by examiner

*Primary Examiner*—Andrew Faile
*Assistant Examiner*—Son P. Huynh (57) ABSTRACT

There is disclosed a decoder buffer capable of receiving streaming video data packets and storing the data packets in a plurality of access units. Each of the access units holds at least one data packet associated with a selected frame in the streaming video. The decoder buffer comprises: 1) a first buffer region comprising at least one access unit for storing data packets that are less immediately needed by the video decoder; and 2) a re-transmission region comprising at least one access unit for storing data packets that are most immediately needed by the video decoder. The decoder buffer, in response to a detection of a missing data packet in the re-transmission region, requests that the streaming video transmitter retransmit the missing packet.

21 Claims, 4 Drawing Sheets

DECODER BUFFER FOR STREAMING VIDEO RECEIVER AND METHOD OF OPERATION

CROSS-REFERENCE TO RELATED APPLICATIONS

The present invention is related to that disclosed in U.S. Provisional Patent Application. No. 60/108,939, filed on Nov. 18, 1998, entitled "SCALABLE VIDEO STREAMING USING MPEG-4", which is commonly assigned to the assignee of the present invention. The disclosure of this related provisional patent application is incorporated herein by reference for all purposes as if fully set forth herein.

TECHNICAL FIELD OF THE INVENTION

The present invention is directed, in general, to video processing systems and, more specifically, to a decoder buffer for use in a streaming video receiver.

BACKGROUND OF THE INVENTION

Real-time streaming of multimedia content over Internet protocol (IP), networks has become an increasingly common application in recent years. A wide range of interactive and non-interactive multimedia Internet applications, such as news con-demand, live TV viewing, video conferencing, and many others rely on end-to-end streaming solutions. Unlike a "downloaded" video file, which may be retrieved first in "non-real" time and viewed or played back later, streaming video applications require a video source to encode and to transmit a video signal over a network to a video receiver, which must decode and display the video signal in real time. The receiver relies on a decoder buffer to receive encoded video data packets from the network and to transfer the packets to a video decoder.

Two problems arise when a streaming video signal is transmitted across a non-guaranteed Quality-of-Service (QoS) network, such as the Internet. First, end-to-end variations in the network (e.g., delay jitter) between the streaming video transmitter and the streaming video receivers mean that the end-to-end delay is not constant. Second, there is usually a significant packet loss rate across non-QoS networks, often requiring re-transmission. The lost data packet must be recovered prior to the time the corresponding frame must be decoded. If not, an underflow event occurs. Furthermore, if prediction-based compression is used, an underflow due to lost data packets may not only impact the current frame being processed, but may affect many subsequent frames.

It is well-known that re-transmission of lost packets is a viable means of recovery for continuous media communication over packet networks. Many applications use a negative automatic repeat request (NACK) in conjunction with re-transmission of the lost packet. These approaches take into consideration both the round-trip delay and the delay jitter between the sender and the receiver(s).

For example, an end-to-end model with re-transmission for packet voice transmission has been developed. This model takes advantage of the fact that voice data consists of periods of silence separated by brief talk-spurt segments. The model also assumes that each talk-spurt consists of a fixed number of fixed-size packets. However, this model is not general enough to capture the characteristics of compressed video (which can have variable number of bytes or packets per video frame).

There is therefore a need in the art for improved streaming video receivers that compensate for variations inherent in a non-QoS network. In particular, there is a need for an improved receiver decoder buffer that takes into consideration both transport delay parameters (e.g., end-to-end delay and delay jitter) and video encoder buffer constraints. More particularly, there is a need for an improved decoder buffer that eliminates the separation between the network transport buffer, which is typically used to remove delay jitter and to recover lost data, and the video decoder buffer.

SUMMARY OF THE INVENTION

The present invention is embodied in an Integrated Transport Decoder (ITD) buffer model. One key advantage of the ITD model is that it eliminates the separation of a network-transport buffer, which is typically used for removing delay jitter and recovering lost data, from the video decoder buffer. This can significantly reduce the end-to-end delay, and optimize the usage of receiver resources (such as memory).

It is a primary object of the present invention to provide, for use with a video decoder capable of decoding streaming video, a decoder buffer capable of receiving from a streaming video transmitter data packets comprising the streaming video and storing the data packets in a plurality of access units. Each of the, access units is capable of holding at least one data packet associated with a selected frame in the streaming video. The decoder buffer comprises: 1) a first buffer region comprising at least one access unit capable of storing data packets that are less immediately needed by the video decoder; and 2) a re-transmission region comprising at least one access unit capable of storing data packets that are most immediately. needed by the video decoder, wherein the decoder buffer, in response to a detection of a missing, data packet in the re-transmission region requests that the streaming video transmitter retransmit the missing packet.

In one embodiment of the present invention, at least one of the data packets are stored in the first buffer region for a period of time equal to a start-up delay time of the decoder buffer.

In another embodiment of the present invention, the data packets are first stored in the first buffer region and are shifted into the re-transmission region.

In still another embodiment of the present invention, the first buffer region is separate from the re-transmission region.

In yet another embodiment of the present invention, the first buffer region overlaps at least a portion of the re-transmission region.

In a further embodiment of the present invention, the first buffer region overlaps all of the re-transmission region.

In a further embodiment of the present invention, the first buffer region is separated from the re-transmission region by a second buffer region in which a late data packet is late with respect to an expected time of arrival of the late data packet, but is not sufficiently late to require a re-transmission of the late data packet.

The foregoing has outlined rather broadly the features and technical advantages of the present invention so that those skilled in the art, may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit, and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged streaming video receiver.

Additionally, those skilled in the art will readily understand that while the embodiment of the present invention described below is principally oriented towards streaming video, this is by way of illustration only. In fact, the improved integrated transport decoder buffer described below may be readily adapted for use in connection with streaming audio data or other streaming data that must be supplied to a decoder at a required rate.

Figure 1:
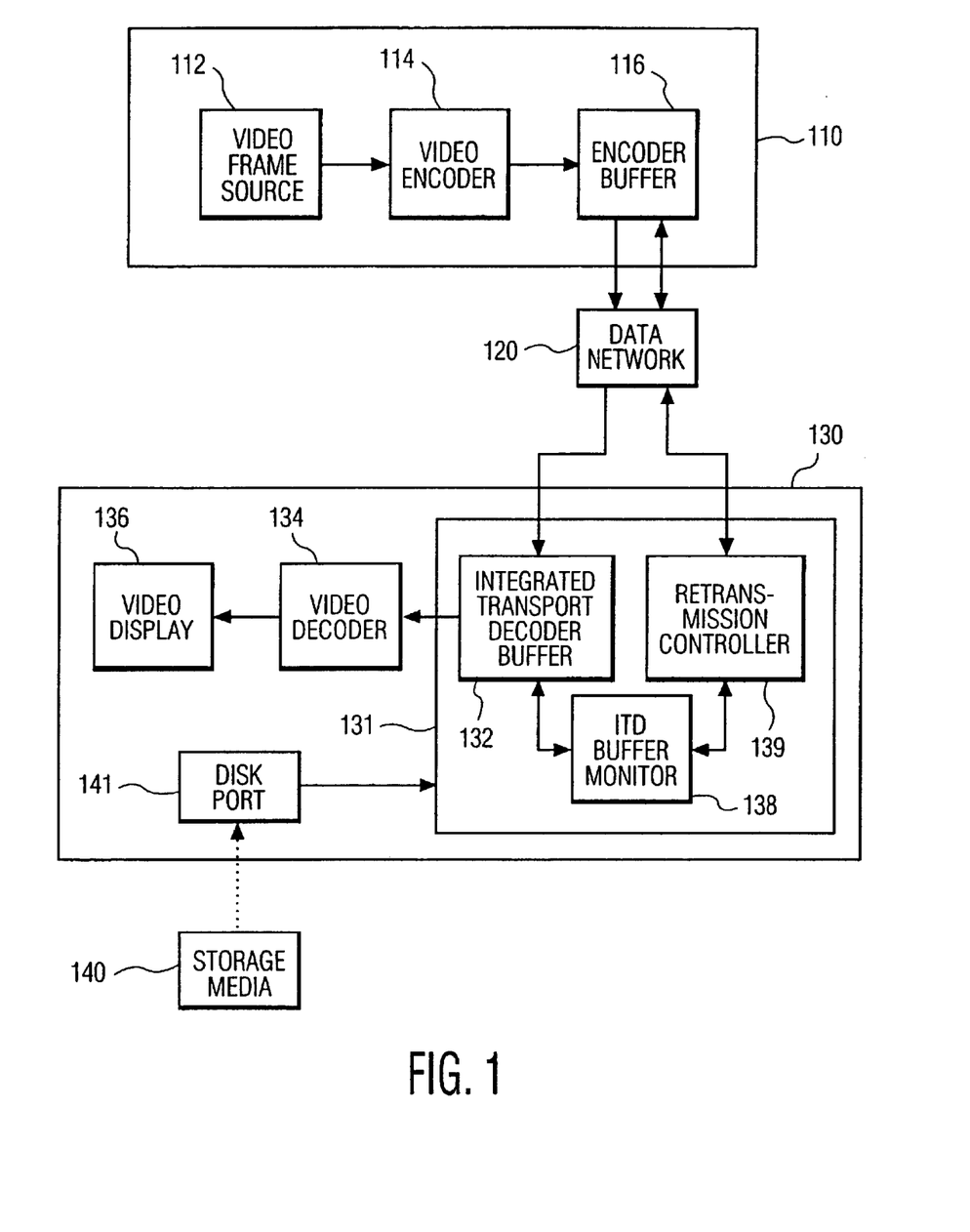
FIG. 1 illustrates an end-to-end transmission of streaming video from a streaming video transmitter through a data network to an exemplary streaming video receiver according to one embodiment of the present invention.

FIG. 1 illustrates an end-to-end transmission of streaming video from streaming video transmitter 110 through data network 120 to streaming video receiver 130, according to one embodiment of the present invention. Depending on the application, streaming video transmitter 110 may be any one of a wide variety of sources of video frames, including a data network server, a television station, a cable network, a desktop personal computer (PC), or the like. Streaming video transmitter 110 comprises video frame source 112, video encoder 114 and encoder buffer 116. Video frame source 112 may be any device capable of generating a sequence of uncompressed video frames, including a television antenna and receiver unit, a video cassette player, a video camera, a disk storage device capable of storing a "raw" video clip, and the like.

The uncompressed video frames enter video encoder 114 at a given picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable IP network and may include portions of both public data networks, such as the Internet, and private data networks, such as an enterprise-owned local area network (LAN) or wide area network (WAN).

Streaming video receiver 130 comprises decoder buffer 131, video decoder 134 and video display 136. Decoder buffer 131 receives and stores streaming compressed video frames from data network 120. Decoder buffer 131 then transmits the compressed video frames to video decoder 134 as required. Video decoder 134 decompresses the video frames at the same rate (ideally) at which the video frames were compressed by video encoder 114.

Decoder buffer 131 further comprises integrated transport decoder (ITD) buffer 132, ITD buffer monitor 138 and re-transmission controller 139. In accordance with the principles of the present invention, ITD buffer 132 integrates both temporal and data-unit occupancy considerations in order to provide video decoder 134 with compressed video frames at a rate that is sufficient to avoid underflow conditions, during which video decoder 134 is starved for compressed video frames.

ITD buffer 132 accomplishes this in cooperation with ITD buffer monitor 138 and re-transmission controller 139. ITD buffer monitor 138 monitors the level of data-occupancy in ITD buffer 132 and detects missing data packets and potential underflow conditions. In response to notification from ITD buffer monitor 138, re-transmission controller 139 requests re-transmission of data missing from ITD buffer 132 in order to avoid underflow conditions. In an advantageous embodiment of the present invention, ITD buffer 132, ITD buffer monitor 138, and re-transmission controller 139 are implemented in a personal computer (PC) that receives streaming video and/or audio from, for example, the Internet over a high-speed data line. In such an, embodiment, ITD buffer 132 may be implemented in main random access memory. (RAM) of the PC or in RAM on a video card, and ITD buffer monitor 138 and re-transmission controller 139 may be implemented in the CPU of the PC. To implement ITD buffer 132 in a PC environment, ITD buffer 132 may be embodied as computer executable instructions stored as a program on storage media 140, such as a CD-ROM, computer diskette, or similar device, that may be loaded into removable disk port 141 in streaming video receiver 130.

Continuous decoding of compressed video frames is a key requirement of a real-time multimedia application, such as streaming video. To meet this requirement, a decoder-encoder buffer model is normally used to ensure that underflow and overflow events do not occur. These constraints limit the size (bit-wise) of video pictures that enter the encoder buffer. The constraints are usually expressed in terms of encoder-buffer bounds, which when adhered to by the encoder, guarantee continuous decoding and presentation of the compressed video stream at the receiver.

Figure 2:
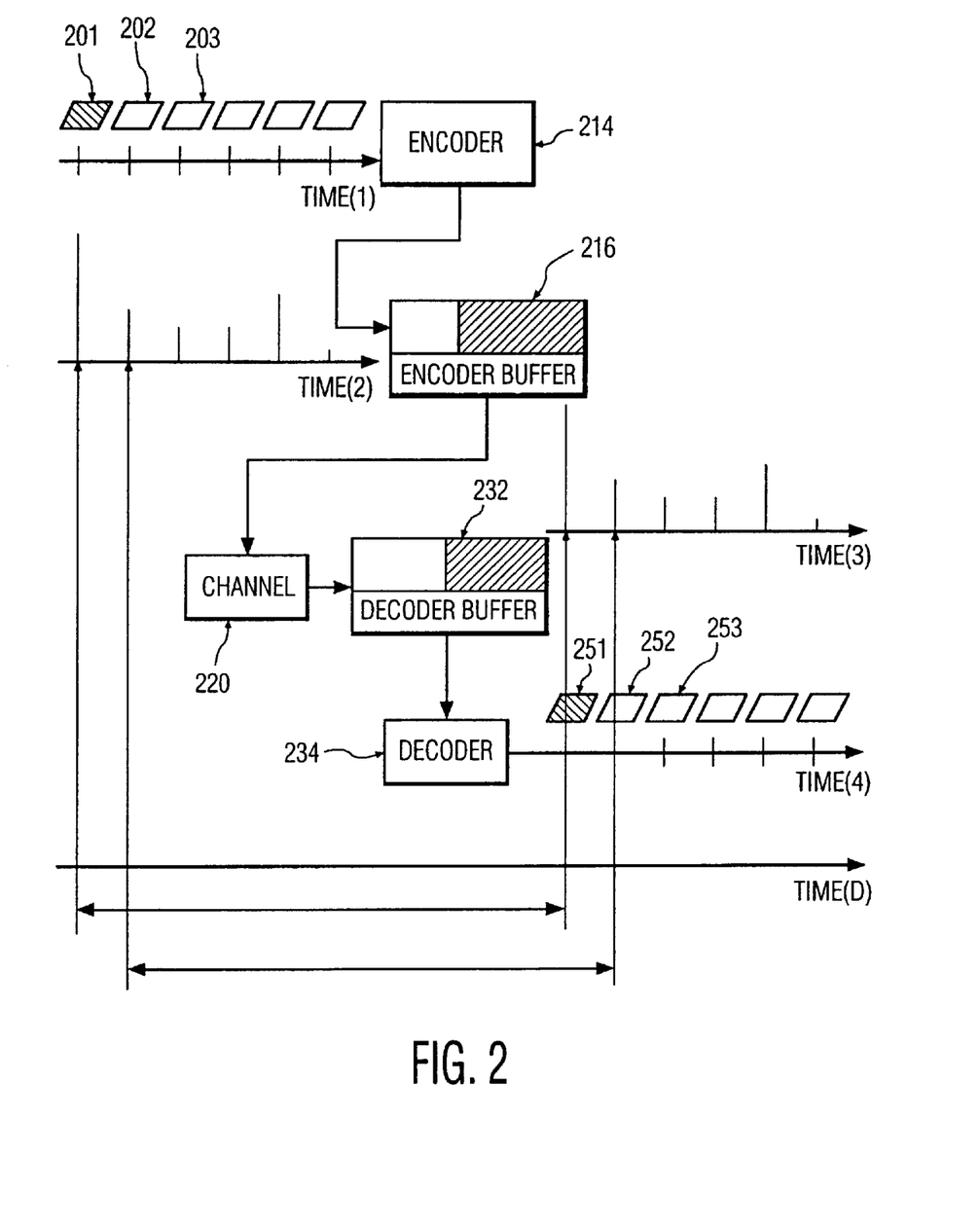
FIG. 2 illustrates an ideal encoder-decoder model of a video coding system.

FIG. 2 shows an ideal encoder-decoder model of a video coding system. Under this ideal model, uncompressed video frames 201–203 enter the compression engine of encoder 214 at a given picture-rate, X frames/second, as indicated by the Time(1) line. The compressed frames exit encoder 214 and enter encoder buffer 216 at the same X frames/second, as indicated by the Time(2) line. Similarly, the compressed frames exit decoder buffer 216 and enter channel 220 at X frames/second. Channel 220 is a generic representation of any transmission medium, such as the Internet, that transfers compressed video frames from a transmitting source to a receiver. In the ideal case, the delay of channel 220 ($\delta_c$) is a constant value.

Next, the compressed frames exit channel 220 and enter decoder buffer 232 at the same X frames/second as at the input and the output of encoder 214, as indicated by the Time(3) line. Decoder buffer 232 transmits the compressed frames to decoder 234, which decompresses the frames and outputs decompressed frames 251–253 at the original X frames/second at which frames entered encoder 214.

Ideally, the end-to-end buffering delay (i.e., the total delay encountered in both encoder buffer 216 and decoder buffer 232) is constant. However, the same piece of compressed video data (e.g., a particular byte of the video stream) encounters different delays in encoder buffer 216 and decoder buffer 232. In the ideal model, encoding in encoder 214 and decoding in decoder 234 are instantaneous and require zero execution time and data packets are not lost.

The encoder buffer bounds can be expressed using discrete-time summation. In discrete-time domain analysis, $\Delta$ is the end-to-end delay (i.e., including both encoder buffer 216 and decoder buffer 232 and channel delay $\delta_c$) in units of time. For a given video coding system, $\Delta$ is a constant number applicable to all frames entering the encoder-decoder buffer model.

To simplify the discrete-time analysis, it is assumed that the end-to-end buffering delay ($\Delta T=\Delta-\delta_c$) is an integer-multiple of the frame duration (T). Therefore, $N\Delta=N(\Delta-\delta_c)/T$ represents the delay of the encoder and decoder buffers in terms of the number of video frames (N). For the purposes of clarity and brevity in describing the principles of the present invention, the remainder of this disclosure will use time units specified in frame-duration intervals. For example, using the encoder time reference shown in FIG. 2, the $n^{th}$ frame enters encoder buffer 216 at time index "n". The decoder time-reference of decoder buffer 232 is shifted by the channel delay ($\delta_c$), with respect to encoder buffer 216.

The data rate (r) at the output of encoder (e) 214 during frame-interval "i" may be represented as $r^e(i)$. Here, "data rate" is used generically. It could signify bit rate, byte rate, or even packet rate. Similarly, the data rate at the input of decoder buffer 232 may be represented as $r^d(i)$. Based on the ideal model, $r^e(iT)=r^d(iT+\delta_c)$. In addition, based on the convention established above, $r^e(i)=r^d(i)$. Thus, the bounds of is encoder buffer 216 can be expressed as:

$$\max\left[\left(\sum_{j=n+1}^{n+\Delta N} r^e(j) - B_{max}^d\right), 0\right] \leq$$

$$B^e(n) \leq \min\left[\left(\sum_{j=n+1}^{n+\Delta N} r^e(j)\right), B_{max}^e\right]$$

Equation 1 where $B_{max}^d$ and $B_{max}^e$ are the maximum decoder and encoder buffer sizes respectively.

In the ideal case, it is also assumed that encoder 214 starts transmitting data immediately after the first frame enters encoder 214. Therefore, the start-up delay $dd_f$ (i.e., the delay time the first piece of data from the first picture spends in decoder buffer 232 prior to decoding) equals the end-to-end, encoder-decoder buffer delay: $dd_f=\Delta T=T \cdot \Delta N$.

In one embodiment of the present invention, ITD buffer 132 minimizes underflow events by taking into consideration the above-described problems of the ideal buffer model and the ideal encoder-decoder buffer constraints. ITD buffer 132 is based on lost packet recovery using re-transmission.

Figure 3:
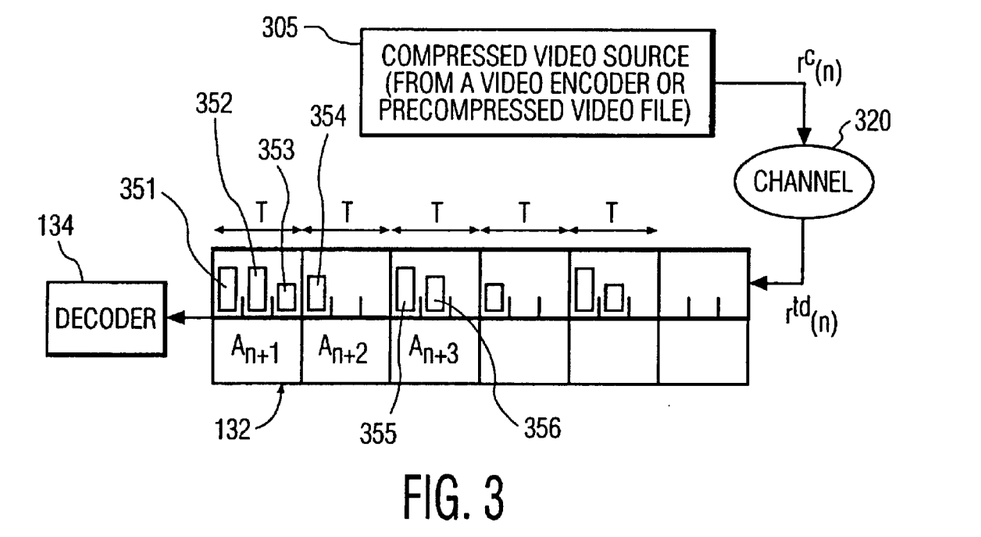
FIG. 3 illustrates end-to-end transmission of streaming video from a compressed video source through a channel to an exemplary integrated transport decoder buffer and video decoder, without support for re-transmission, according to one embodiment of the present invention.

FIG. 3 is a simplified block diagram of exemplary end-to-end transmission of streaming video, without support for re-transmission. For the purposes of simplicity and clarity, streaming video transmitter 110 has been replaced by compressed video source 305 and data network 120 has been replaced by channel 320. Compressed video source 305 transmits data packets at rate $r^e(n)$ and channel 320 transmits data packets at rate $r^{rd}(n)$. Since video re-transmission is not supported for this embodiment, ITD buffer monitor 138 and re-transmission controller 139 are omitted from the diagram. Streaming video receiver 130 has been simplified and is represented by ITD buffer 132 and video decoder 134.

As noted above, ITD buffer 132 integrates temporal and data-unit occupancy models. ITD buffer 132 is divided into temporal segments of 'T' seconds each. By way of example, the parameter T may be the frame period in a video sequence. The data packets (bits, bytes, or packets) associated with a given duration T are buffered in the corresponding temporal segment. All of the data packets associated with a temporal unit are referred to as an "access" unit. By way of example, data packets 351, 352, and 353 comprise access unit $A_{n+1}$, data packet 354 comprises access unit $A_{n+2}$, and data packets 355 and 356 comprise access unit $A_{n+3}$.

During time interval n, the $n^{th}$ access unit, $A_n$, is being decoded by decoder 134 and access unit $A_{n+1}$ is stored at the temporal segment nearest to the output of ITD buffer 132. An access unit may be an audio frame, a video frame, or even a portion of a video frame, such as Group of Blocks (GOB). Therefore, the duration required to decode or display an access unit is the same as the duration of the temporal segment T. During the time-interval n, the rate at which data enters ITD buffer 132 is $r^{rd}(n)$. The number-of data packets in each access unit are not required to be the same. Compression algorithms used in video encoder 114 may compress the data packets in successive access units by different amounts, even though each access unit represents temporal units of the same duration.

For example, the three data packets 351–353 in access unit $A_{n+1}$ may comprise a complete video frame, Frame 1. The single data packet 354 in $A_{n+2}$ may represent only those portions of Frame 2 that are different than Frame 1. Nonetheless, data packet 354 is sufficient to create Frame 2 if the Frame 1 data is already known. Since Frame 1 and Frame 2 have the same duration, the temporal segment, T, is the same for $A_{n+1}$ and $A_{n+2}$.

Each temporal segment holds a maximum number of packets, $K_{max}$, with each packet having a maximum size, $b_{max}$, (in bits or bytes) Therefore, the maximum size of an access unit, $S_{max}$, may be represented by $S_{max} \leq K_{max}(b_{max})$. Video encoder 114 is assumed to begin each access-unit with a new packet that is present only in that access unit.

The amount of data in ITD buffer 132 at time index n, $B^{td}(n)$, may be described by terms of $B^a(n)$ and $B^b(n)$. $B^a(n)$, represents the number of consecutive-and-complete access units in ITD buffer 132 at the beginning of interval n, and $B^b(n)$ represents the total consecutive amount of data in ITD buffer 132 at the end of interval n. For $B^a(n)$, temporal segments containing partial data are not counted, and all segments following a partial segment, are also not counted even if they contain a complete, access-unit worth of data. Hence, $T \cdot B^a(n)$ represents how much video in temporal units (e.g. seconds) that the ITD buffer 132 holds at time index n (without running into an underflow if no more data arrives).

Therefore, if $S_n$ denotes the size of access unit n, the relationship between $B^a$ and $B^b$ can be expressed as Equation 2 below:

$$B^b(n) = \sum_{j=N+1}^{n+B^a(n)} S_j + U_{B^a(n)+1} \qquad \text{Equation 2}$$

where $S_j$ is the maximum size of the access unit for temporal segment j and $U_{B^a(n)+1}$ is the partial (incomplete) data of access unit $A_{n+B^a(n)+1}$ which is stored in temporal segment $B^a(n)+1$ at the beginning of time index n.

When re-transmission is supported as, an embodiment, ITD buffer 132 requires capability for a) outputting one temporal segment (T) worth of data at the beginning of every temporal time-interval n; b) detecting lost packet(s) and transmitting associated negative acknowledge (NACK) messages to the transmitter 110 or 305; c) continuously storing newly arrived primary (i.e., not re-transmitted) packets; and d) storing re-transmitted packets. The ideal ITD buffer 132 maintains the data rate of the video stream, without delays caused by re-transmission of any lost data. In other words, if $r^e(n)$ is the transmission data rate used by an idealized video encoder 114 under lossless circumstances, ideal ITD buffer 132 will maintain this date rate without degradation caused by the re-transmission process. Depending upon the number of re-transmission requests, encoder buffer 116 may adjust its output data rate $r^e(n)$, with a corresponding adjustment by ITD buffer 132.

In one embodiment, decoder buffer 131 adds buffering for the incoming video stream in order to compensate for the time required for detection and recovery of lost data and for the delay associated with a "real" world implementation. By delaying all incoming video streams by this compensation time, decoder buffer 131 outputs video stream data at a continuous rate as required for decoding. Re-transmission controller 139 and ITD buffer 132 incorporate processes for minimizing the time for detecting the absence of packets and transferring NACKs for re-transmission by streaming video transmitter 110. The minimum duration of time needed for detecting a predetermined number of lost packets is represented by $T_L$. In general, $T_L$ is a function of the delay jitter caused by-data arriving later than expected by ITD buffer 132.

The minimum amount of time needed for streaming video receiver 130 to recover a packet after being declared lost is represented by $T_R$. Time $T_R$ includes the time required for streaming video receiver 130 to send a NACK to streaming video transmitter 110 and the time needed for the re-transmitted data to reach streaming video receiver 130 (assuming that the NACK and re-transmitted data are not lost).

Exemplary decoder buffer 131 transfers a re-transmitted packet with a minimum delay. $(T_L+T_R)$ for the lost packet interval. If the minimum delay experienced by any video data for an ideal decoder buffer 131 is represented by $dd_{min}$, the amount of delay $\Delta_R$ that may be added to the minimum ideal delay in order to account for the total delay for re-transmission is:

$$\Delta_R \geq u(T_L+T_R-dd_{min}) \qquad \text{Equation 3}$$

where $u(x)=x$ for $x>0$, and $u(x)=0$ for $x \leq 0$.

Decoder buffer 131 adds delay $\Delta_R$ buffering for all output data to video decoder 134 in order to provide time for decoding and transferring of the data, resulting in continuous video streams. Therefore, the total encoder buffer 116 to decoder buffer 132 output delay ($\Delta_{TOT}$) may be represented by:

$$\Delta_{TOT}=\Delta_{ideal}+\Delta_R \geq \Delta_{ideal}+u(T_L+T_R-dd_{min}) \qquad \text{Equation 4}$$

ITD buffer 132 provides buffering (storage) for a minimum number of temporal segments ($B_{min}^a$) as compensation for re-transmission time requirements and as prevention for an underflow event. The ITD buffer 132 sizing may be based, for example, on minimum and maximum boundaries for storing temporal segments. The process for determining these boundaries is described in the following paragraphs.

In the absence of lost packets and delay jitter, at any time index n, the TD buffer 132 provides the following occupancy capability:

$$TB^a(n) \geq TB_{min}^a = T_L+T_R \qquad \text{Equation 5}$$

An ideal ITD buffer 132 has a maximum decoding delay ($dd_{max}$), where $dd_{max} \leq \Delta_{ideal}$. Consequently, in the absence of lost packets and delay jitter, ideal ITD buffer 132 satisfies the following requirement:

$$T \cdot B^a(n) \leq dd_{max}+u(T_L+T_R-dd_{min}) \leq \Delta_{ideal}+u(T_L+T_R-dd_{min}) \quad \text{Equation 6}$$

Further, in the absence of lost data and delay jitter, the ideal ITD buffer 132 provides storage requirements for $TB^a(n)$ data, bounded as follows:

$$T_L+T_R \leq T \cdot B^a(n) \leq dd_{max}+u(T_L+T_R-dd_{min}) \qquad \text{Equation 7}$$

ITD buffer 132 storage capability with consideration for delay jitter may be expressed as:

$$T_R \leq T \cdot B^a(n) \leq dd_{max}+u(T_L+T_R-dd_{min})+T_E \qquad \text{Equation 8}$$

where $T_E$ is the delay jitter associated with packets arriving earlier than expected to ITD buffer 132. Therefore, if $B_{max}^a$ is the maximum number of temporal segments that ITD buffer 132 holds, then:

$$T \cdot B_{max}^a \geq dd_{max}+u(T_L+T_R-dd_{min})+T_E \qquad \text{Equation 9}$$

or $$B_{max}^a \geq \left\lceil \frac{dd_{max} + u(T_L + T_R - dd_{min}) + T_E}{T} \right\rceil$$

ITD buffer 132 storage capability is based on the above equations, minimum ideal storage requirements, and, delays associated with data transfers. ITD buffer 132 has a minimum size determined by ideal encoder buffer 116 which is represented by $B_{max}{}^a$. ITD buffer 132 provides added storage to adjust for delays introduced by ITD buffer 132 and for data arriving earlier than expected. ITD buffer 132 storage requirements (in temporal units) for accommodation of these exemplary delays is represented by $T_{extra}$, as shown below.

$$T_{extra} = u(T_L + T_R - dd_{min}) + T_E \qquad \text{Equation 10}$$

Using this relationship, ITD buffer 132 storage requirement for satisfying the $B_{max}{}^b$ upper limit (in temporal units), is shown by the following upper boundary relationship:

$$B_{max}{}^b \geq B_{max}{}^d + R_{max} \cdot T_{extra} = B_{max}{}^d + R_{max}[u(T_L + T_R - dd_{min})] \quad \text{Equation 11}$$

An ideal ITD buffer 132 has a minimum decoding delay ($dd_{min}$) which is equal to zero and a maximum decoding delay ($dd_{max}$) which is equal to the ideal end-to-end buffering delay ($\Delta_{ideal}$). The ideal ITD buffer 132 is sized to provide extra minimum delay that is equal to $T_L + T_R$, where $T_L$ and $T_R$ are assumed to be integer-multiples of the duration T. The minimum time delay requirement is found by substituting the ideal buffer region $dd_{min}=0$ and $d_{max}=\Delta_{ideal}$ into previously described equation for $\Delta_{TOT}$. This extra buffer requirement stores $N_L + N_R$ temporal segments, where $N_R = T_R/T$ and $N = T_L/T$. Thus, ideal ITD buffer 132 is found to provide storage for the following number of temporal segments:

$$B_{max}{}^a \geq N_L + N_R + \lceil (T_E + dd_{max})/T \rceil \qquad \text{Equation 12}$$

Since the maximum decoding delay, $dd_{max} = \Delta_{ideal} = \Delta T$, corresponds to $\Delta N$ temporal segments, $B_{max}{}^b$ is further described as follows:

$$B_{max}{}^a \geq N_R + N_L + \Delta N = N_E \qquad \text{Equation 13}$$

where $N_E = \lceil T_E/T \rceil$.

Figure 4:
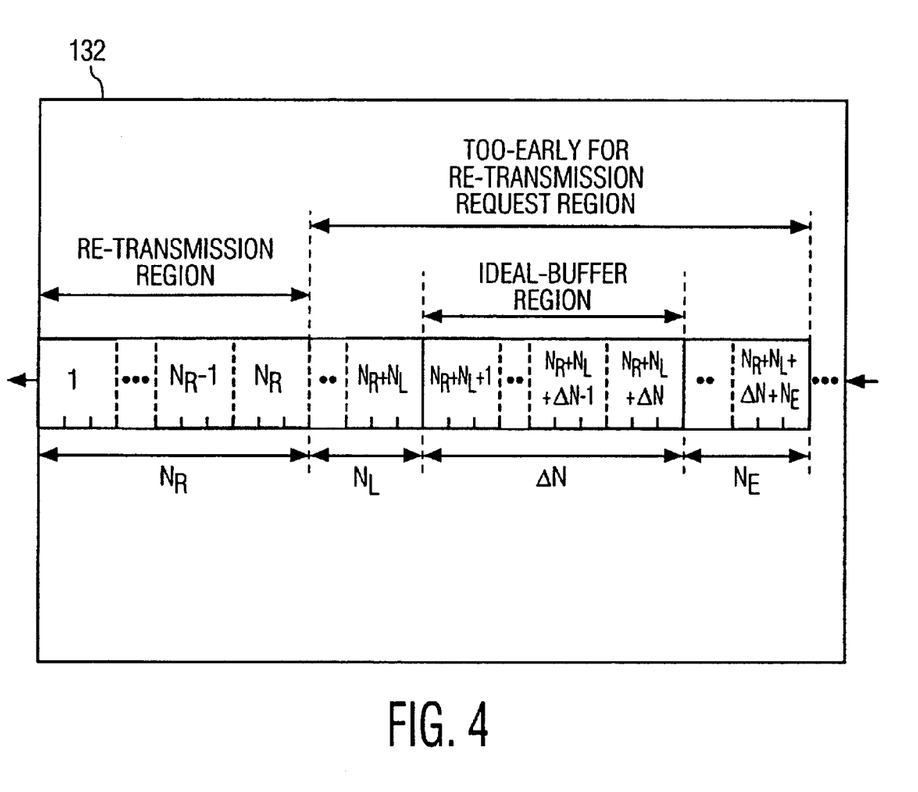
FIG. 4 illustrates a sequence diagram showing the flow of data packets through different and distinct regions of exemplary ideal integrated transport decoder buffer.

FIG. 4 is a sequence diagram showing the flow of data packets through different regions of exemplary ITD buffer 132 under the assumption that $dd_{min}=0$ (the lower boundary level) and $d_{max}=\Delta_{ideal}$. ITD buffer 132 data enters from the right side of the diagram and exits to the video decoder 134 at the left side. The most recently received data is in a buffer area which is labeled "too-early for re-transmission request region" (too-early). Depending on the location in the too-early region of the buffer, ITD buffer 132 introduces buffer delays labeled $N_E$, $\Delta N$, or $N_L$. The area of this too-early buffer region which comprises the ideal delay $\Delta N$, is labeled as the ideal-buffer region. ITD buffer 132 manages the ideal-buffer region as an ideal video buffer, i.e., data packets flow through this region and are only delayed by the inherent characteristics of the buffer element(s). Ideal ITD buffer 132 provides the remaining too-early buffer areas to compensate for delays associated with the transfer of video streams from streaming video transmitter 110 to decoder 131 ($N_E$), as well as delays caused by delayed or lost video packets ($N_L$)

ITD buffer 132 provides delay $N_R$ in the re-transmission region in order to compensate for expected time requirements for the initiation and reception of re-transmission requests. Exemplary decoder buffer 131 initiates re-transmission requests during the time periods associated with the re-transmission region.

It is important to note that the ideal-buffer and re-transmission regions may overlap, depending on the values of the different delay parameters ($dd_{min}$, $T_R$, $T_L$). However, for the exemplary ideal ITD buffer 132 with $dd_{min}=0$, the re-transmission and ideal-buffer regions do not overlap.

For ITD buffer 132, $N_E$ represents the initial decoding delay ($dd_f$) which corresponds to the amount of delay-encountered by the very first piece of data that enters the buffer prior to the decoding of the first picture (or access unit). This $dd_f$ is based on, among other things, the streaming video transmitter 110 and data network 120 data transmission rates during elapsed time $dd_f$. In the ideal case, ITD buffer 132 uses this same data rate for entering received data into its buffer (storage) regions. Ideal decoder buffer 131 recognizes the amount of data in its ITD buffer 132 regions just prior to the time that the first access unit is decoded as $B_0{}^d$ data. This $B_0{}^d$ data, also referred to as "start-up-delay" data, is determined from the following relationship:

$$B_0^d = \sum_{j=1}^{\Delta N} r^e(j) \qquad \text{Equation 14}$$

When $dd_{min}=0$, ideal decoder buffer 131 re-transmission processing is comprised of the following procedures:

1. The ideal-buffer region is filled until all data associated with the start-up delay are in the buffer. Since lost events may also occur during this time interval, these data may be treated in a special way, such as by using reliable transmission (e.g. using TCP) for them. The ideal condition for lossless data is satisfied when:

$$\sum_{k=N_R+N_L+1}^{N_R+N_L+\Delta N} B_k = B_0^d \qquad \text{Equation 15}$$

where $B_k$ is the amount of data stored in ideal ITD buffer 132 temporal segment k at any instant of time.

2. After Equation 15 is satisfied, ITD buffer 132 advances the content of all temporal storage segments by one segment toward the buffer output. Subsequently, ideal ITD buffer 132 repeats this process every T units of time. After $N_L + N_R$ periods of T (i.e. after $T_L + T_R$), decoder 134 starts decoding the first access unit. The time-period that starts when decoding of the first access unit begins is labeled $T_1$. Hence, the beginning of any time period n ($T_n$) represents the time when access unit $A_{n+k}$ is moved to temporal segment k.

3. Ideal ITD buffer 132 considers data missing in temporal segment $N_R$ of the re-transmission buffer region as lost. This condition occurs when:

$$B_{N_R}(n) < S_{n+N_R} \qquad \text{Equation 16}$$

where $B_{N_R}(n)$ is the amount of data in temporal segment $N_R$ at time period n and $S_j$ is the size of access unit j. When ideal ITD buffer 132 determines that data is missing, it sends a re-transmission request to streaming video transmitter 110.

4. Ideal ITD buffer 132 places arriving re-transmitted data into their corresponding temporal segments of the re-transmission region. Assuming the re-transmitted data are received, ideal ITD buffer 132 transfers the re-transmitted data to the video decoder 134 prior to the decoding times of their corresponding access units.

Figure 5:
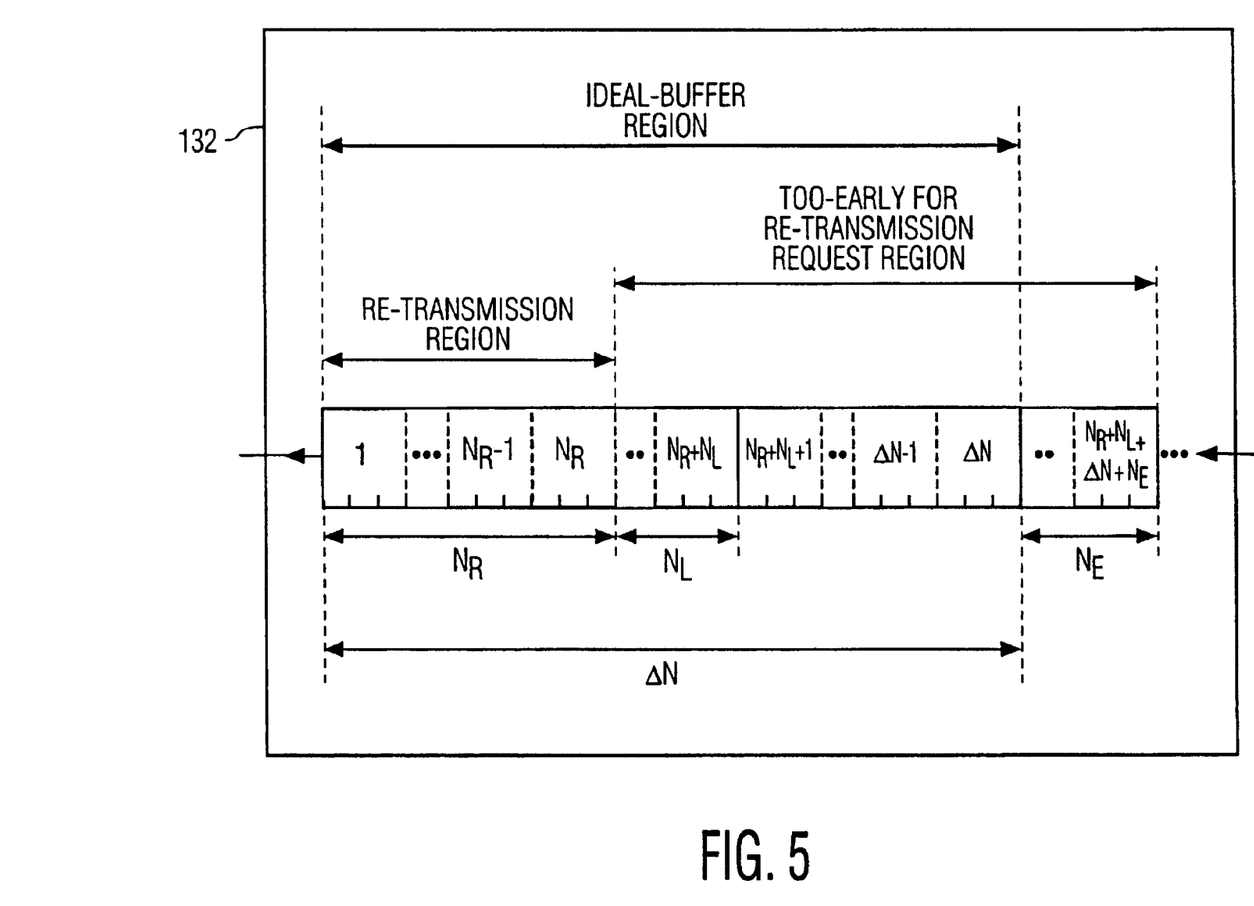
FIG. 5 illustrates a sequence diagram showing the flow of data packets through different over-lapping regions of exemplary integrated transport decoder buffer configured for the maximum outer boundary range.

FIG. 5 is a sequence diagram showing the flow of data packets through different, regions of exemplary ITD buffer 132 with over-lap between the ideal buffer, $N_L$, and re-transmission regions. For this case, ITD buffer 132 is configured for the maximum outer boundary where $dd_{min} \geq T_L + T_R$, causing its ideal-buffer region to totally over-lap its re-transmission region. Thus, decoder buffer 131 transfers the received video stream to video decoder 134 after all of the data associated with the start-up delay arrives. Then, video decoder 134 decodes the first access unit without further delays. Decoder buffer 131 performs the re-transmission function as previously described.

In a similar manner, decoder buffer 131 provides data transfer between streaming video transmitter 110 and video decoder 134 for the general case when $dd_{min}$ has a value between the minimum and maximum boundary areas (i.e., when $0<dd_{min}<T_L+T_R$), with an additional delay of $(T_L+T_R-dd_{min})$.

Although the present invention has been described in detail, those skilled in the art should understand that they can make various changes, substitutions and alterations herein without departing from the spirit and scope of the invention in its broadest form.

What is claimed is:

1. For use with a video decoder for decoding streaming video, a decoder buffer for receiving from a streaming video transmitter data packets comprising said streaming video and storing said data packets in a plurality of access units, each of said access units for holding at least one data packet associated with a selected frame in said streaming video, wherein said decoder buffer comprises:

a first buffer region comprising at least one access unit for storing data packets that are less immediately needed by said video decoder; and a re-transmission region comprising at least one access unit for storing data packets that are most immediately needed by said video decoder, wherein said decoder buffer, in response to a detection of a missing data packet in said retransmission region requests that said streaming video transmitter retransmit said missing packet.

2. The decoder buffer set forth in claim 1 wherein at least one of said data packets are stored in said first buffer region for a period of time equal to a start-up delay time of said decoder buffer.

3. The decoder buffer set forth in claim 1 wherein said data packets are first stored in said first buffer region and are shifted into said re-transmission region.

4. The decoder buffer set forth in claim 1 wherein said first buffer region is separate from said re-transmission region.

5. The decoder buffer set forth in claim 1 wherein said first buffer region overlaps at least a portion of said re-transmission region.

6. The decoder buffer set forth in claim 5 wherein said first buffer region overlaps all of said re-transmission region.

7. The decoder buffer set forth in claim 1 wherein said first buffer region is separated from said re-transmission region by a second buffer region in which a late data packet is late with respect to an expected time of arrival of said late data packet, but is not sufficiently late to require a re-transmission of said late data packet.

8. A receiver for receiving encoded streaming data comprising:

a device for at least one of: 1) displaying streaming video data associated with said encoded streaming data and 2) audibly playing streaming audio data associated with said encoded streaming data;

a decoder for decoding said encoded streaming data; and a decoder buffer for receiving from a streaming data transmitter data packets comprising said encoded streaming data and storing said data packets in a plurality of access units, each of said access units for holding at least one data packet associated with a selected portion of said encoded streaming data, wherein said decoder buffer comprises:

a first buffer region comprising at least one access unit for storing data packets that are less immediately needed by said decoder; and a re-transmission region comprising at least one access unit for storing data packets that are most needed by said decoder, wherein said decoder buffer, in response to a detection of a missing data packet in said re-transmission region requests that said streaming video transmitter retransmit said missing packet.

9. The receiver set forth in claim 8 wherein at least one of said data packets are stored in said first buffer region for a period of time equal to a start-up delay time of said decoder buffer.

10. The receiver set forth in claim 8 wherein said data packets are first stored in said first buffer region and are shifted into said re transmission region.

11. The receiver set forth in claim 8 wherein said first buffer region is separate from said re-transmission region.

12. The receiver set forth in claim 8 wherein said first buffer region overlaps at least a portion of said re-transmission region.

13. The receiver set forth in claim 12 wherein said first buffer region overlaps all of said re-transmission region.

14. The receiver set forth in claim 8 wherein said first buffer region is separated from said retransmission region by a second buffer region in which a late data packet is late with respect to an expected time of arrival of said late data packet, but is not sufficiently late to require a re-transmission of said late data packet.

15. For use with a video decoder capable of decoding streaming video, a method for buffering the streaming video comprising the steps of:

receiving from a streaming video transmitter data packets comprising the streaming video and storing the data packets in a plurality of access units in a decoder buffer, each of the access units for holding at least one data packet associated with a selected frame in the streaming video;

storing data packets that are less immediately needed by the video decoder in a first buffer region of the decoder buffer comprising at least one access unit for storing data packets; and storing data packets that are most immediately needed by the video decoder in a re-transmission region of the decoder buffer comprising at least one access unit, wherein the decoder buffer, in response to a detection of a missing data packet in the re-transmission region, requests that the streaming video transmitter retransmit the missing packet.

16. The decoder buffer set forth in claim 15 wherein at least one of the data packets are stored in the first buffer region for a period of time equal to a start-up delay time of the decoder buffer.

17. The decoder buffer set forth in claim 15 wherein the data packets are first stored in the first buffer region and are shifted into the re-transmission region.

18. The decoder buffer set forth in claim 15 wherein the first buffer region is separate from the re-transmission region.

19. The decoder buffer set forth in claim 15 wherein the first buffer region overlaps at least a portion of the re-transmission region.

20. The decoder buffer set forth in claim 19 wherein the first buffer region overlaps all of the re-transmission region.

21. The decoder buffer set forth in claim 15 wherein the first buffer region is separated from the re-transmission region by a second buffer region in which a late data packet is late with respect to an expected time of arrival of the late data packet, but is not sufficiently late to require a re-transmission of the late data packet.

\* \* \* \* \*